I. L. DICKINSON.
Churn.
No. 10,487.
Patented Jan. 31, 1854.
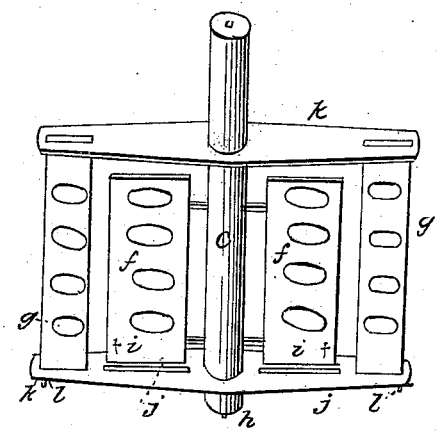
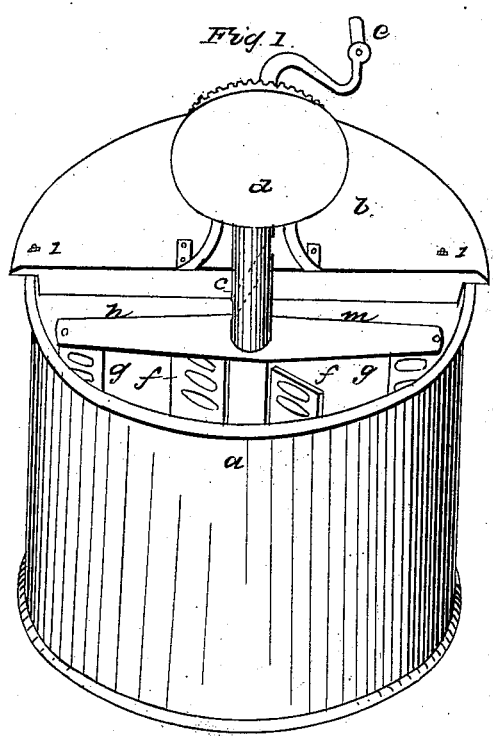

UNITED STATES PATENT OFFICE.

ISAAC L. DICKINSON, OF RICHMOND, INDIANA.

CHURN.

Specification of Letters Patent No. 10,487, dated January 31, 1854.

*To all whom it may concern:*

Be it known that I, ISAAC L. DICKINSON, of Richmond, in the county of Wayne and State of Indiana, have invented a new and useful Improvement on Churns, which I denominate Dickinson's Improved Churn; and I do hereby declare that the following is a full, clear, and exact description of the construction and operation of the same, reference being had to the accompanying drawings, making a part of this specification, in which—

Figure 1, is a perspective view, and Figs. 2 and 3 sections of the same.

In Fig. 1, $a$, is the tub or vessel—$b$, the lid, but half of which is on.

$i$, $i$, are staples to fasten the lid to the tub.

$c$ is the shaft which revolves in the tub on pivot $h$, Fig. 2, and to which dashers $f$, $f$, Figs. 1, and 2, are attached. The dashers are perforated with holes as represented in figures.

$g$, $g$, are the breakers perforated as the dashers, and connected by the arms $k$, $k$, through which the shaft $c$ passes. The breakers are held stationary by pins $l$, $l$, Fig. 2, entering holes in the bottom of the tub.

$e$, Fig. 1, is the crank to turn driver, bevel wheel, $d$, which works in small pinion bevel wheel on upper end of shaft $c$.

$m$, is an oblique hole through shaft $c$, to admit air into the churn.

$i$, $i$, Figs. 2 and 3 are small springs attached to bottom end of dasher boards $f$, $f$.

$b$, Fig. 3, represents the edge of the dasher with the spring $i$, on the side near the outer edge. The breakers $g$, $g$, may be elevated so as to raise the pins $l$, $l$, out of the holes. Fig. 2, the bottom end of the dashers entering the slots $j$, $j$, and the springs $i$, $i$, pressing against the side of the slots secures them to the dashers by friction. The breakers and dashers may thus be made to revolve together. Its operation is plain.

The cream or milk being put into the tub, the dashers are revolved around the shaft by turning the crank $e$, the breakers remaining stationary, when the butter is separated the breakers are elevated as above described, and revolve with the dashers forming the whole sweep of the tube, for the purpose of collecting the butter—the dasher and breakers being held together in this position by the springs $i$, $i$, before mentioned.

What I claim as my invention and desire to secure by Letters Patent is—

The combination of the movable or rotating dashes $f$, $f$, with the breakers $g$, $g$, constructed and operated as above described, so that said breakers may remain stationary, while churning and revolving with the dashers to collect the butter substantially as herein described.

ISAAC L. DICKINSON.

Witnesses:
 N. S. LEEDS,
 OLIVER BUTLER.